(12) United States Patent
Adusumilli et al.

(10) Patent No.: US 12,566,601 B2
(45) Date of Patent: Mar. 3, 2026

(54) METHOD FOR AUTOMATIC BOOTSTRAPPING ENVIRONMENT USING OPERATING SYSTEM AND ADDRESS OF IMAGING LOCATION FOR REMOTE NODE CONFIGURATION

(71) Applicant: Nutanix, Inc., San Jose, CA (US)

(72) Inventors: Monica Adusumilli, Rajahmundry (IN);
Toms Varghese, Thiruvalla (IN);
Kumar Sidhartha, Bangalore (IN);
Amritesh Patidar, Bangalore (IN)

(73) Assignee: Nutanix, Inc., San Jose, CA (US)

( * ) Notice: Subject to any disclaimer, the term of this patent is extended or adjusted under 35 U.S.C. 154(b) by 2 days.

(21) Appl. No.: 18/504,978

(22) Filed: Nov. 8, 2023

(65) Prior Publication Data

US 2025/0147746 A1 May 8, 2025

(51) Int. Cl.
*G06F 9/00* (2018.01)
*G06F 8/61* (2018.01)
*G06F 9/4401* (2018.01)

(52) U.S. Cl.
CPC .............. *G06F 8/63* (2013.01); *G06F 9/4406* (2013.01)

(58) Field of Classification Search
CPC .............. G06F 8/63; G06F 9/4406; G06F 9/00
See application file for complete search history.

(56) References Cited

U.S. PATENT DOCUMENTS

| | | | | |
|---|---|---|---|---|
| 6,980,239 | B1 * | 12/2005 | Motta | .................... H04N 25/76 |
| | | | | 348/211.6 |
| 7,920,549 | B2 | 4/2011 | Alt et al. | |
| 8,085,695 | B2 | 12/2011 | Kushalnagar et al. | |
| 8,429,276 | B1 | 4/2013 | Kumar et al. | |
| 8,549,518 | B1 | 10/2013 | Aron et al. | |
| 8,601,473 | B1 | 12/2013 | Aron et al. | |

(Continued)

FOREIGN PATENT DOCUMENTS

| | | |
|---|---|---|
| CN | 105573810 A | 5/2016 |
| CN | 107479937 A | 12/2017 |

(Continued)

OTHER PUBLICATIONS

International Search Report and Written Opinion received in PCT/US2019/032284 mailed Aug. 23, 2019.

(Continued)

*Primary Examiner* — Tammara R Peyton
(74) *Attorney, Agent, or Firm* — Stoel Rives LLP

(57) ABSTRACT

A system and method for imaging a self-bootstrapping computing node includes booting, from a boot device, the computing node into a bootstrapping environment using a bootstrap operating system, where the bootstrap operating system is configured with an address of an imaging location, accessing the imaging location and receiving a software image for the computing node, and, imaging the computing node using the software image including installing another operating system on the computing node to boot from the boot device. Monitoring a status of the computing node's imaging operations using an application programming interface (API), monitoring a health status of the computing node, and enabling restart of the boot process upon failure (e.g., self-healing, self-recovery, etc.), is also described.

42 Claims, 6 Drawing Sheets

200

(56) References Cited

U.S. PATENT DOCUMENTS

| 8,656,018 | B1 * | 2/2014 | Keagy ................ G06F 9/45533 |
| | | | 718/104 |
| 8,726,274 | B2 | 5/2014 | Pafumi et al. |
| 8,776,050 | B2 | 7/2014 | Plouffe et al. |
| 8,850,130 | B1 | 9/2014 | Aron et al. |
| 8,863,124 | B1 | 10/2014 | Aron |
| 8,938,523 | B2 | 1/2015 | Jaroker |
| 9,009,106 | B1 | 4/2015 | Aron et al. |
| 9,027,087 | B2 | 5/2015 | Ishaya et al. |
| 9,069,708 | B2 | 6/2015 | Gill et al. |
| 9,130,837 | B2 | 9/2015 | Bjarnason et al. |
| 9,135,145 | B2 | 9/2015 | Voccio et al. |
| 9,152,447 | B2 | 10/2015 | Venkat et al. |
| 9,262,155 | B2 | 2/2016 | Johnsen et al. |
| 9,336,132 | B1 | 5/2016 | Aron et al. |
| 9,426,026 | B2 | 8/2016 | Rider |
| 9,426,030 | B1 | 8/2016 | Anerousis et al. |
| 9,652,265 | B1 | 5/2017 | Narayanasamy et al. |
| 9,716,624 | B2 | 7/2017 | Zeyliger et al. |
| 9,747,287 | B1 | 8/2017 | Bhardwaj et al. |
| 9,772,866 | B1 | 9/2017 | Aron et al. |
| 10,120,725 | B2 | 11/2018 | Jubran et al. |
| 10,191,757 | B2 | 1/2019 | Venkataramaiah et al. |
| 10,284,642 | B2 | 5/2019 | Shanley et al. |
| 10,374,877 | B2 | 8/2019 | Patterson et al. |
| 10,516,760 | B2 | 12/2019 | Chugtu et al. |
| 10,534,600 | B2 | 1/2020 | Bertani et al. |
| 10,979,289 | B2 | 4/2021 | Sidhartha et al. |
| 11,005,973 | B2 * | 5/2021 | Chugtu ................... H04L 67/34 |
| 11,159,367 | B2 | 10/2021 | Finn et al. |
| 11,212,168 | B2 | 12/2021 | Sidhartha et al. |
| 11,334,367 | B2 * | 5/2022 | Liu ........................ G06F 9/4416 |
| 12,069,184 | B2 * | 8/2024 | Liu ........................ G06F 3/0679 |
| 2005/0120160 | A1 | 6/2005 | Plouffe et al. |
| 2005/0169195 | A1 | 8/2005 | Luo et al. |
| 2006/0143432 | A1 | 6/2006 | Rothman et al. |
| 2006/0155674 | A1 | 7/2006 | Traut et al. |
| 2010/0017597 | A1 | 1/2010 | Chandwani |
| 2011/0075591 | A1 | 3/2011 | Cheshire |
| 2012/0079474 | A1 | 3/2012 | Gold et al. |
| 2012/0150985 | A1 | 6/2012 | Marion et al. |
| 2012/0207291 | A1 | 8/2012 | West et al. |
| 2013/0227144 | A1 | 8/2013 | Saito et al. |
| 2013/0287026 | A1 | 10/2013 | Davie |
| 2014/0156824 | A1 | 6/2014 | Biswas et al. |
| 2015/0096011 | A1 | 4/2015 | Watt |
| 2015/0134791 | A1 | 5/2015 | Cohn et al. |
| 2015/0271014 | A1 | 9/2015 | Madama |
| 2015/0341189 | A1 | 11/2015 | Zhang et al. |
| 2015/0363724 | A1 | 12/2015 | Chatterjee et al. |
| 2015/0365323 | A1 | 12/2015 | Duminuco et al. |
| 2016/0006607 | A1 | 1/2016 | Wang et al. |
| 2016/0212044 | A1 | 7/2016 | Danforth |
| 2016/0255045 | A1 | 9/2016 | Kolesnik et al. |
| 2017/0223053 | A1 | 8/2017 | Dhanabalan et al. |
| 2018/0129524 | A1 | 5/2018 | Bryant et al. |
| 2018/0367530 | A1 | 12/2018 | Mistry |
| 2018/0375921 | A1 | 12/2018 | Wang et al. |
| 2019/0166032 | A1 * | 5/2019 | Inbaraj .................... H04L 43/20 |
| 2019/0188021 | A1 | 6/2019 | Finn et al. |
| 2019/0356541 | A1 | 11/2019 | Finn et al. |
| 2020/0044917 | A1 | 2/2020 | Peng |
| 2021/0051062 | A1 | 2/2021 | Sidhartha et al. |
| 2021/0152420 | A1 | 5/2021 | Sidhartha et al. |
| 2021/0382738 | A1 | 12/2021 | Huang et al. |

FOREIGN PATENT DOCUMENTS

| EP | 3438829 | A1 | 6/2021 |
| WO | 2016014803 | A1 | 1/2016 |
| WO | 2019222262 | A1 | 11/2019 |

OTHER PUBLICATIONS

U.S. Appl. No. 18/671,838 titled "Systems and Methods for Upgrading Unconfigured Nodes, Including Examples of Health Monitoring and Parallel Upgrades" filed May 22, 2024.

Communication Pursuant to Article 94(3) EPC dated Feb. 14, 2022 for EP Application 19726864.2, pp. 1-5.

"Cisco HyperFlex Edge 4.0 with Cisco Intersight—Deployment Guide for HyperFlex Edge Systems with Cisco Intersight Cloud Management Platform and VMware ESXi", Cisco, Oct. 11, 2019, pp. 68-96.

"Cluster create", NetApp | https://docs.netapp.com/us-en/ontap-cli-9121/cluster-create.html#description, Nov. 29, 2022, pp. 2.

"Create a Deploy Rule", VMWare Docs; retrieved from: https://docs.vmware.com/en/VMware-vSphere/7.0/com.vmware.esxi.install.doc/GUID-DF1FFD91-1BBC-492B-AB4E-AEB1D3C9BB03.html, Feb. 11, 2020.

"Deployment—VMware Validated Design for Remote Office Branch Office 4.3", VMware Validated Design 4.3 VMware Validated Design for Remote Office Branch Office 4.3, Sep. 25, 2018, pp. 34-36.

"Introduction to vSphere Auto Deploy", VMWare Docs; retrieved from: https://docs.vmware.com/en/VMware-vSphere/6.5/com.vmware.vsphere.install.doc/GUID-9A827220-177E-40DE-99A0-E1EB62A49408.html, Apr. 18, 2022.

"Introduction to vSphere Auto Deploy", VMWare Docs; retrieved from: https://docs.vmware.com/en/VMware-vSphere/7.0/com.vmware.esxi.upgrade.doc/GUID-9A827220-177E-40DE-99A0-E1EB62A49408.html, Apr. 18, 2022.

"Isilon: How to perform simultaneous drive firmware updates manually using Drive Support Package 1.19 and newer", Dell Technologies | https://www.dell.com/support/kbdoc/en-in/000019212/how-to-perform-simultaneous-drive-firmware-updates-manually-using-the-latest-drive-support-package, Aug. 23, 2022, pp. 4.

"SmartProvisioning R76 Administration Guide", Check Point: Software Technologies LTD, Feb. 7, 2013, pp. 87-97.

"VSphere Auto Deploy Boot Process", VMWare Docs; retrieved from: https://docs.vmware.com/en/VMware-vSphere/7.0/com.vmware.esxi.install.doc/GUID-8C221180-8B56-4E07-88BE-789B25BA372A.html, Nov. 23, 2022.

Abhilash , "VMware vSphere 5.5 Cookbook", Packt Publishing, Limited, Olton Birmingham, Feb. 27, 2015.

Cano, Ignacio , et al., "Curator: Self-Managing Storage for Enterprise Clusters", University of Washington, Mar. 2017, pp. all.

Khmelnitsky, Michael , "Qumulo in GCP: Upgrade an Unconfigured Node", Qumulo Care | https://care.qumulo.com/hc/en-us/articles/360037777433-Qumulo-in-GCP-Upgrade-an-Unconfigured-Node#in-this-article-0-0, May 2022, pp. 8.

Poitras, Stevens , et al., "The Nutanix Bible", https://nutanixbible.com, May 21, 2024, pp. 268.

"Bootstrap a Node", ProgressChef | https://docs.chef.io/install_bootstrap/, Retrieved Dec. 14, 2022, pp. 16.

"Kubernetes Infrastructure", Red Hat | https://docs.openshift.com/container-platform/3.11/architecture/infrastructure_components/kubernetes_infrastructure.html, Retrieved Nov. 4, 2022, pp. 15.

"Node Bootstrapping", ProgressChef | https://docs.chef.io/automate/ha_node_bootstraping/, Retrieved Dec. 14, 2022, pp. 4.

"VxRail node image management (NIM) tool", Make It Work | https://make-it-work.net/2022/01/vxrail-node-image-management-nim-tool/, Jan. 4, 2022, pp. 6.

Poitras, Steven , "The Nutanix Bible", https://nutanixbible.com/, Apr. 9, 2019, pp. all.

Poitras, Steven , "The Nutanix Bible", http://stevenpoitras.com/the-nutanix-bible/ (Publication date based on indicated capture date by Archive.org; first publication date unknown), Jan. 11, 2014, pp. all.

Poitras, Steven , "The Nutanix Bible", https://nutanixbible.com/, Jan. 12, 2016, pp. all.

Poitras, Steven , "The Nutanix Bible", https://nutanixbible.com/, Jan. 3, 2017, pp. all.

Poitras, Steven , "The Nutanix Bible", https://nutanixbible.com/, Jan. 3, 2018, pp. all.

Poitras, Steven , "The Nutanix Bible", http://stevenpoitras.com/the-nutanix-bible/ (Publication date based on indicated capture date by Archive.org; first publication date unknown), Jan. 7, 2015, pp. all.

(56)                    References Cited

OTHER PUBLICATIONS

Poitras, Steven , "The Nutanix Bible", https://nutanixbible.com/, Jan. 8, 2019, pp. all.

Poitras, Steven , "The Nutanix Bible", https://nutanixbible.com/, Jul. 25, 2019, pp. all.

Poitras, Steven , "The Nutanix Bible", http://stevenpoitras.com/the-nutanix-bible/ (Publication date based on indicated capture date by Archive.org; first publication date unknown), Jun. 20, 2014, pp. all.

Poitras, Steven , "The Nutanix Bible", https://www.nutanixbible.com, Jun. 23, 2023, pp. 1-263.

Poitras, Steven , "The Nutanix Bible", https://nutanixbible.com/, Jun. 25, 2018, pp. all.

Poitras, Steven , "The Nutanix Bible", https://nutanixbible.com/, Jun. 8, 2017, pp. all.

Poitras, Steven , "The Nutanix Bible", http://stevenpoitras.com/the-nutanix-bible/ (Publication date based on indicated capture date by Archive.org; first publication date unknown), Jun. 9, 2015, pp. all.

Poitras, Steven , "The Nutanix Bible", https://nutanixbible.com/, Jun. 9, 2016, pp. all.

Poitras, Steven , "The Nutanix Bible", https://nutanixbible.com/, Mar. 2, 2020, pp. all.

Poitras, Steven , "The Nutanix Bible", https://nutanixbible.com/, Mar. 2, 2021, pp. all.

Poitras, Steven , "The Nutanix Bible", http://stevenpoitras.com/the-nutanix-bible/ (Publication date based on indicated capture date by Archive.org; first publication date unknown), Oct. 15, 2013, pp. all.

Poitras, Steven , "The Nutanix Bible", https://nutanixbible.com/, Sep. 1, 2020, pp. all.

Poitras, Steven , "The Nutanix Bible", https://nutanixbible.com/, Sep. 17, 2019, pp. all.

Poitras, Steven , "The Nutanix Bible", https://nutanixbible.com/, Sep. 3, 2021, pp. all.

Poitras, Steven , "The Nutanix Bible", https://nutanixbible.com/, Sep. 4, 2015, pp. all.

Poitras, Steven , "The Nutanix Bible—Classic Edition", https://nutanixbible.com/ (Mar. 1, 2023), Mar. 1, 2023, pp. all.

Poitras, Steven , "The Nutanix Bible—Classic Edition", https://nutanixbible.com/ (Sep. 9, 2022), Sep. 9, 2022, pp. all.

* cited by examiner

100

200

300

<u>500</u>

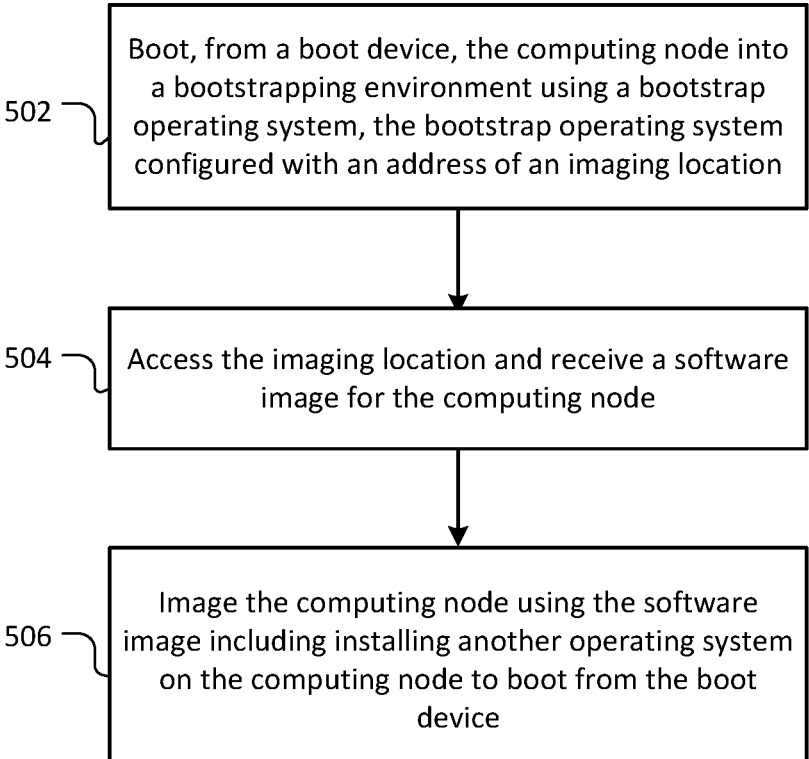

502 — Boot, from a boot device, the computing node into a bootstrapping environment using a bootstrap operating system, the bootstrap operating system configured with an address of an imaging location 504 — Access the imaging location and receive a software image for the computing node 506 — Image the computing node using the software image including installing another operating system on the computing node to boot from the boot device

METHOD FOR AUTOMATIC BOOTSTRAPPING ENVIRONMENT USING OPERATING SYSTEM AND ADDRESS OF IMAGING LOCATION FOR REMOTE NODE CONFIGURATION

TECHNICAL FIELD

The present disclosure relates generally to systems and methods for imaging a computing node, including use of a boot device. Examples of using the boot device to boot the computing node into a bootstrapping environment via a bootstrap operating system, receive a software image including another operating system from an image hosting server, and image the computing node using the another operating system are described. Examples of monitoring the imaging of the computing node using an application programming interface (API) and monitoring the health status of the computing node are also described.

BACKGROUND

In traditional systems, imaging and configuring remote nodes often requires another coordinating node, an orchestrator, a standalone virtual machine, or the like, which is used to image the remote nodes. In these traditional systems, the imaging and configuring of the remote nodes often starts by establishing a network connection between a coordinating node and the remote node. Next, an imaging and configuration tool is deployed on the coordinating node. The tool is utilized to remotely access and control the remote node, allowing for image deployment, software configuration, and system customization. So far, for the nodes to be imaged and configured, they would need another coordinating node or a standalone virtual machine which can image the nodes. With the demand for faster deployments, the flexibility that single node deployment would offer would be immense.

BRIEF DESCRIPTION OF THE DRAWINGS

Reference is now made to the following descriptions taken in conjunction with the accompany drawings, in which:

FIG. 5 is a flow diagram of a method 500 for imaging a self-bootstrapping computing node, arranged in accordance with examples described herein; and FIG. 6 is a schematic illustration of components of a computing node, arranged in accordance with examples described herein.

DETAILED DESCRIPTION

Figure 1:
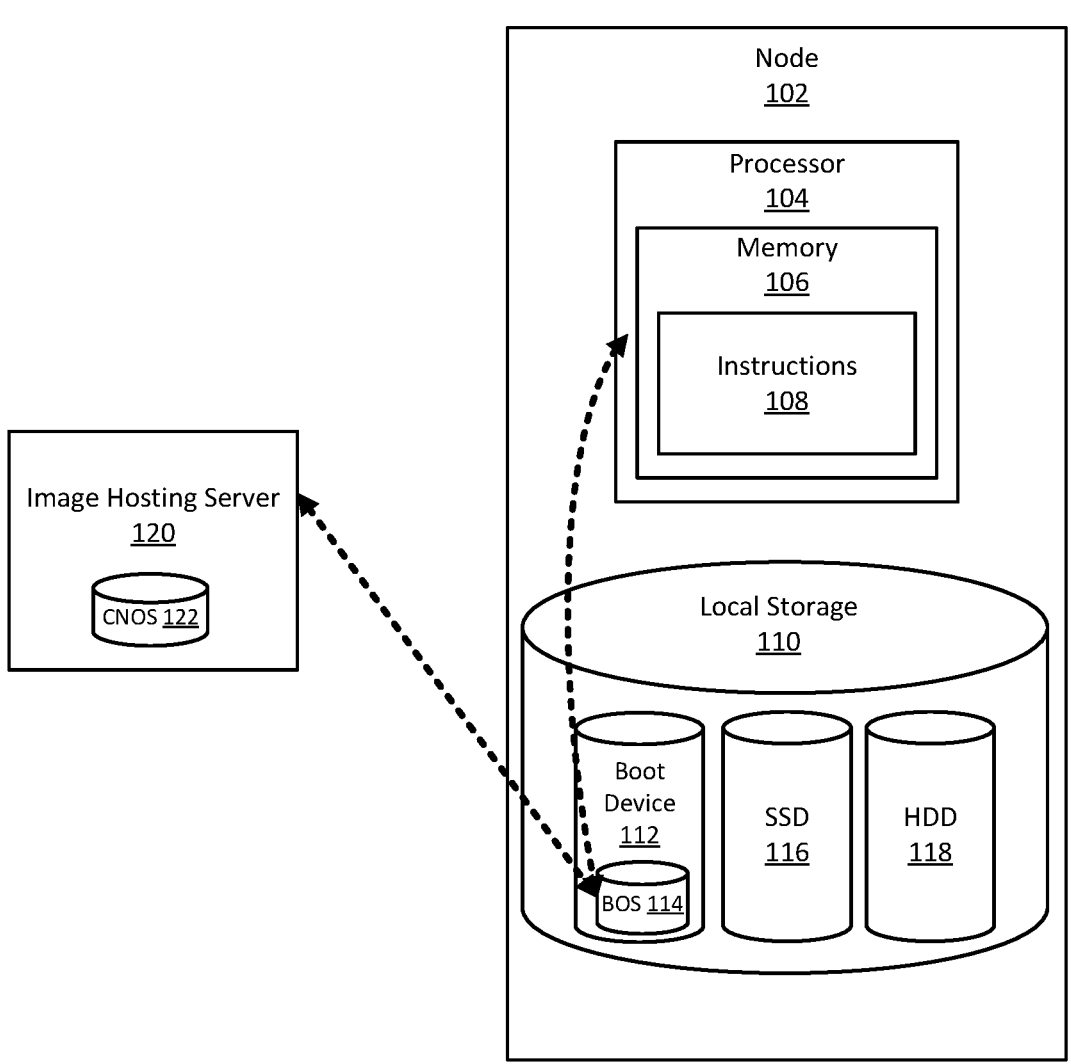
FIG. 1 is a schematic illustration of a self-bootstrapping system for self-bootstrapping a computing node prior to being imaged with an operating system, arranged in accordance with examples described herein.

Certain details are set forth herein to provide an understanding of described embodiments of technology. However, other examples may be practiced without various ones of these particular details. In some instances, well-known computing system components, virtualization components, circuits, control signals, timing protocols, and/or software operations have not been shown in detail in order to avoid unnecessarily obscuring the described embodiments. Other embodiments may be utilized, and other changes may be made, without departing from the spirit or scope of the subject matter presented herein. The various embodiments disclosed herein are not necessarily mutually exclusive, as some disclosed embodiments can be combined with one or more other disclosed embodiments to form new embodiments.

Due in part to drawbacks of traditional systems described herein, it may be desirable to facilitate the self-imaging and self-configuration (including self-booting) of a remote node without the assistance of a coordinating node, an orchestrator, a standalone virtual machine, or the like. Once booted and/or imaged, the remote node may join a cluster of nodes. For example, one or more virtual machines on the node may be registered with a cluster service on another node such that the remote node may function as part of a distributed system implemented using the cluster of nodes. Generally, a cluster herein refers to a plurality of computing nodes that may work together to provide high availability, reliability, and/or scalability. A cluster of computing nodes may provide a distributed system where instances of a distributed service may be hosted on each of the plurality of computing nodes. If one computing node and/or instance of the distributed service becomes unavailable, another instance of the distributed application resident on another computing node may take over for operations of the instance that is unavailable. In some examples, one computing node and/or instance is a leader node which may coordinate operation of other computing nodes and/or instances in the cluster. In some examples, a single-node cluster is described. Examples of single-node clusters may include multiple instances of an application on a single computing node. Examples of single-node clusters may in some examples contain only single instances of applications. Single-node clusters may in some examples have less resiliency than multiple node clusters.

The present disclosure relates generally to systems and methods for self-booting and self-imaging a computing node, including the use of a boot device. Examples of using the boot device to boot the computing node into a bootstrapping environment via a bootstrap operating system, receiving a software image including another operating system from an image hosting server, and imaging the computing node using the another operating system are described. Examples of self-healing and self-recovery are also described.

As should be appreciated, there are a number of technical advantages and benefits associated with the systems and methods described throughout. Examples of systems and methods described herein may (1) support multiple hardware configurations of a remote computing node, (2) monitor node progress via a REST server running on the node, (3) support fallback and re-initialization in case of failures, (4) support the ability to install a new operating system (e.g., Hypervisor) of user/client/administrator choice, (5) address the issue of independence of computing node imaging, whereby a computing node can image itself without having to depend on other orchestrators, which may improve security and lead to faster bootstrapping, (6) address at least the problem of, irrespective of if the state a computing node (e.g., a remote computing node) is in at the beginning (e.g., at deployment), the computing node can boot itself into a bootstrapping environment, download the required imaging configuration from an image hosting server (e.g., a filer, etc.), and image itself. Systems and methods described herein also discuss self-heal, self-recovery, and self-re-bootstrapping.

Turning now to FIG. 1, FIG. 1 is a schematic illustration of a self-bootstrapping system 100 for self-bootstrapping and self-imaging a computing node prior to being imaged with an operating system, arranged in accordance with examples described herein.

As described herein, self-bootstrapping system 100 of FIG. 1 generally includes a computing node 102 and image hosting server 120 (e.g., imaging location). Computing node 102 may include processor 104. Processor 104 may include memory 106 and instructions 108. Computing node 102 may include local storage 110, which may include boot device 112, solid-state drive (SSD) 116, and hard disk drive 118. SSD may include a boot operating system 114. Image hosting server 120 may include another operating system (e.g., a computing node operating system) 122. In some examples, computing node 102 in self-bootstrapping system 100 may have been deployed to a remote location and has yet to undergo self-bootstrapping and self-imaging in order to configure itself. As should be appreciated, the components shown in FIG. 1 are exemplary. Additional, fewer, and/or alternative components may be used in other examples.

Computing node 102 may generally implement self-bootstrapping and self-imaging functionality as described herein. Examples of computing node 102 described herein may include, for example, a server computer, a laptop computer, a desktop computer, a tablet computer, a smart phone, or any other type of computing device. In operation, computing node 102 may be in a physically remote location (e.g., remote from other computing nodes, remote from required IT personnel, at a remote office, branch office (ROBO) site, etc.). In some examples, computing node 102 may be in a physically remote location, without the presence of other computing nodes. In some examples, computing node 102 may be in a physically remote location with one or more other computing nodes. In some examples, computing node 102 may by located in a remote location and in a state that is prior to being imaged with an operating system.

Computing node 102, as described herein, may include one or more processors, such as processor 104. Any kind and/or number of processors may be present, including one or more central processing unit(s) (CPUs), graphics processing units (GPUs), other computer processors, mobile processors, digital signal processors (DSPs), microprocessors, computer chips, and/or other processing units configured to execute self-bootstrapping and/or self-imaging instructions, such as executable instructions 108.

Computing node 102 as described herein, may further include memory, such as memory 106. Any type or kind of memory may be present (e.g., read only memory (ROM), random access memory (RAM), solid state drive (SSD), and secure digital card (SD card)). While a single box is depicted as memory 106, any number of memory devices may be present. The memory 106 may be in communication (e.g., electrically connected, electrically coupled, communicatively coupled, etc.) to processor 104. Memory 116, as described herein, may store executable instructions for execution by the processor 104, such as executable instructions for self-bootstrapping and/or self-imaging 108.

Computing node 102, as described herein, may include local storage 110. The local storage 110 may include, for example, one or more solid state drives (SSD 116), one or more hard disk drives (HDD 118), and/or one or more boot devices, including boot device 112. As described herein, boot device 112 may include bootstrap operating system 114. In some examples, bootstrap operating system 114 may be used to boot computing node into a bootstrapping environment to perform one or more self-bootstrapping and/or self-imaging operations.

Self-bootstrapping system 100, as described herein, may further include an image hosting server, such as image hosting server 120. Image hosting server 120 may be communicatively coupled to computing node 102, and may be accessible to one or more components of computing node 102, such as, for example, boot device 112. In some examples, image hosting server 120 may be or include any form of memory and/or storage, such as an SSD, HDD, NVMe, and the like, configured to store data and or metadata, such as operating system data. In some examples, image hosting server 120 may include one or more operating systems, such another operating system 122 (e.g., a computing node operating system). In some examples, the another operating system 122 may be a NUTANIX® operating system comprising one or more controller VMs, and/or one or more hypervisors. As should be appreciated, another operating system 122 encompasses any number and type of operating system, including operating systems with different architectures, suitable for being used to image one or more of the computing nodes described herein, including computing node 102.

In some examples, image hosting server 120 may be located remote from computing node 102. In some examples, image hosting server 120 may be located local to computing node 120. In some examples, the location of the image hosting server may be known to computing node by way of boot device 112. For example, the location of image hosting server 120 may comprise a URL using one or more schemes, including Hypertext Transfer Protocol (HTTP), Hypertext Transfer Protocol Secure (HTTPS), Network File System (NFS), Server Message Block (SMB), or combinations thereof. In some examples, the location of the image hosting server may be specified in a dynamic host configuration protocol (DHCP) configuration. In some examples, the location of the image hosting server may be specified in a JavaScript object notation (JSON) file. In some examples, the DHCP configuration and/or the JSON file may be provided to computing node 102.

In some examples, one or more components of computing node 102 may access image hosting server 120 without the need for authentication (e.g., client, user, administrator, etc. authentication). In some examples, another operating system 112 may be used (e.g., by computing node 102) to image itself with one or more operating systems.

Operationally, although FIG. 1 is a schematic illustration of a self-bootstrapping system 100 for self-bootstrapping and self-imaging a computing node prior to being imaged with an operating system, computing node 102, as described herein, may be configured to execute instructions 108 for self-bootstrapping and/or self-imaging. In some examples, computing node 102 may, by executing instructions 108 for self-bootstrapping and/or self-imaging, boot computing node 102 into a bootstrapping environment. In some examples, computing node 102 may be configured to boot itself into the bootstrapping environment using bootstrap operating system 114 via boot device 112. Once computing node 102 is in the bootstrapping environment, computing node 102 may, by executing instructions 108 for self-bootstrapping and/or self-imaging, may be configured to access the image hosting server 120 and receive a software image for computing node 120, the software image comprising the another operating system 122. Once computing node 102 has received the software image comprising the another operating system 122, computing node 102 may, by executing instructions 108 for self-bootstrapping and/or self-imaging, be configured to image computing node 102 using the software image including installing another operating system on computing node 102 to boot from the boot device. In some examples, the software image received from image hosting server 120 and by computing node 102 via boot device 112 may comprise the another operating system (e.g., a computing node operating system, etc.) used to image computing node 102. In some examples, the boot device comprises a solid-state drive (SSD), such as SSD 116, a hard disk drive (HDD), such as HDD 118, and/or a non-volatile memory express (NVMe).

In some examples, a node, such as node 102, begins the imaging process by checking for an imaging request. In some examples, node 102 may check for this request when it is not part of a cluster (or a plurality of) nodes. In some examples, node 102 may check for this request when it is part of a cluster (or a plurality of) nodes. In some examples, when a node, such as node 102, is not part of a cluster, it can check for one or more predefined URL locations for such requests. In some examples, the node may have some node identifier, such as an IP address or the node serial identifier, etc. In some examples, if the node is already running the same software, then it does not need to perform self-imaging. In some examples, if the currently installed software versions on the node (e.g., node 102) are different from what's expected, then the node makes a determination it needs to perform self-imaging, and begins the self-imaging process.

Operationally, although FIG. 1 is a schematic illustration of a self-bootstrapping system 100 for self-bootstrapping and self-imaging a computing node prior to being imaged with an operating system, computing node 102, as described herein, may be configured to, by executing instructions 108, monitor the status of the imaging operations (e.g., the booting, accessing, receiving, imaging, etc.). In some examples, computing node 102, as described herein, may be configured to, by executing instructions 108, monitor the status of the imaging operations using an application programming interface (API) of the bootstrapping environment. In some examples, the API may be a representational state transfer (REST) API. In some examples, the API may be a remote procedure call (RPC) API. In some examples, the API may be a GraphQL API. In some examples, the API may be a combination of any of the API's described herein. As should be appreciated, the API used for monitoring the imaging operations may be an additional and/or alternative APIs to those listed herein, each of which is considered to be within the scope of this disclosure. In some examples, computing node 102 (and/or instructions 108) may not need to invoke an API (such as the APIs described herein) to monitor the status of the imaging operations. In some examples, the system, such as self-bootstrapping system 100 of FIG. 1 may know itself since it may, in some examples, be executing the code to perform the imaging. In some examples, one or more APIs may be exposed by a node, such as node 102, and APIs, such as the APIs described herein, may be used by one or more external systems (if needed) for monitoring the tatus of the imaging operations.

Operationally, although FIG. 1 is a schematic illustration of a self-bootstrapping system 100 for self-bootstrapping and self-imaging a computing node prior to being imaged with an operating system, computing node 102, as described herein, may be configured to, by executing instructions 108, provide (via a display, such as display 620 of FIG. 6) a graphical user interface (GUI) corresponding to and/or associated with the status of the imaging and/or boot operations. In some examples, the status provided by computing node 102 may comprise one or more progress updates associated with the imaging and/or boot operations. In some examples, the progress updates may be stored and/or presented in a log, such as an event log. In some examples, the one or more progress updates are stored on one or more files (e.g., log files, log messages, etc.) that may be accessible via the API of the bootstrapping environment. In some examples, one or more log files, log messages, and the like, may comprise the one or more progress updates, and may be included in the event log. While one or more log files and/or log messages are described as comprising the one or more progress updates, it should be appreciated that the one or more progress updates may be stored and/or provided in a number of formats and/or methods. In some examples, the API may return the progress updates and/or the status of the imaging and/or boot operations in one or more formats, including but not limited to, a JavaScript Object Notation (JSON) format. In some examples, the progress updates can be provided directly as a response to an API request as well as and/or instead of sharing it via a file.

Operationally, although FIG. 1 is a schematic illustration of a self-bootstrapping system 100 for self-bootstrapping and self-imaging a computing node prior to being imaged with an operating system, computing node 102, as described herein, may be configured to monitor and, based on determining that the imaging and/or boot operations have failed, restart the boot process to image computing node 102. In some examples, this may be characterized as self-recovery and/or self-healing. In some examples, failure of the imaging and/or boot operations may be caused by one or more events/factors. For example, in some examples, failure of the imaging and/or boot operations may be caused by a failure to access server 120 and receive the software image for computing node 120. In some examples, failure of the imaging and/or boot operations may be caused by accessing an incorrect image hosting server (as should be appreciated, there may be one or more image hosting servers, such as image hosting server 120, that computing node 102 may be configured to access. Each of the one or more image hosting servers may comprise the same, additional, alternative, and or no operating system, such as another operating system 122). In some examples, failure of the imaging and/or boot operations may be caused by accessing an incorrect software image for computing node 120. In some examples, failure of the imaging and/or boot operations may be caused by one or more of the above events/factors, or a combination of one or more of the above events/factors. As should be appreciated, although not explicitly listed herein, additional and/or alternative events/factors may cause failure of the imaging and/or boot operations and are considered to be within the scope of this disclosure.

As should be appreciated, if the booting and/or imaging operations of a computing node (such as computing node 102) is stalled, traditional systems often require technical expertise to determine the point(s) of failure an either correct them, or restart the operations. In some examples, a foundation state machine may be configured to categorize failures, such as into benign and non-benign, etc., categories. In some examples, this assists and/or enables the rollback to harmless states. In some examples, the rollback is automatic. In some examples, an auto-retry functionality may be provided. In examples, an auto-retry of an old imaging or a new imaging from the persistent benign state. A wizard may be configured to list and/or display the reason(s) for failure and steps to fix the failure. If the failure(s) may be fixed by the software, then in some examples, a "fix me" button may be made available. As should be appreciated, examples of the self-healing systems and methods described herein may (1) reduce the need for manual intervention at customer sites during deployments, and (2) instead of having to start from scratch at every failure, pick up from a benign state (aka failsafe state, as described herein) and proceed there by reducing the time taken in case of failures. In some examples, an option of sending real-time (and/or near-real time) diagnostics via a monitoring tool may also be provided. In some examples, the monitoring tool may be an external monitoring tool. In some examples, the monitoring tool may be an internal monitoring tool. In some examples, the monitoring tool may be software (e.g., executable instructions) running on one or more nodes (e.g., including computing node 102), and/or on an administrator system in communication with the one or more nodes (e.g., including computing node 102). In some examples, the monitoring tool may be software running on a self-bootstrapping node, such as computing node 102.

Operationally, although FIG. 1 is a schematic illustration of a self-bootstrapping system 100 for self-bootstrapping and self-imaging a computing node prior to being imaged with an operating system, computing node 102, as described herein, may be configured to monitor the health of computing node 102 and, in some examples, restart the boot process based on determining computing node 102 is in a failsafe state.

Operationally, although FIG. 1 is a schematic illustration of a self-bootstrapping system 100 for self-bootstrapping and self-imaging a computing node prior to being imaged with an operating system, computing node 102, as described herein, may be configured to join one or more other computing nodes as a plurality of computing nodes upon completion of installing the another operating system 122 on computing node 102. In some examples, the plurality of computing nodes may comprise the one or more other computing nodes and computing node 102 once booted and imaged. In some examples, each node of the plurality of computing nodes may be configured to perform one or more functions, including a distributed file server function, a backup system function, or a combination thereof. In some examples, the plurality of computing nodes may be a cluster of computing nodes. The cluster of computing nodes may implement a distributed system. For example, the cluster of computing nodes may each host an instance of a distributed computing application. Each of the nodes in the cluster of computing nodes may be registered with a cluster service that maintains identification of each of the nodes in the cluster.

Operationally, although FIG. 1 is a schematic illustration of a self-bootstrapping system 100 for self-bootstrapping and self-imaging a computing node prior to being imaged with an operating system, computing node 102, as described herein, may be configured to operate without joining one or more other computing nodes upon completion of installing the another operating system 122 on computing node 102.

For example, upon completion of installing the another operating system 122 on the computing node 102, computing node 102 may be configured to join a single node cluster, where the single node is the recently booted and imaged computing node 102. In some examples, upon completion of installing the another operating system 122, on computing node 102, computing node 102 may be configured to not join a plurality of other computing nodes. In some examples, the plurality of computing nodes and/or computing node 102 may be a cluster of nodes.

In this way, although FIG. 1 is a schematic illustration of a self-bootstrapping system 100 for self-bootstrapping and self-imaging a computing node prior to being imaged with an operating system, computing node 102, by way of boot device 112 comprising bootstrap operating system 114 and imaging sever 120 comprising another operating system 122, is capable of, and is configured to, perform self-bootstrapping, self-imaging, self-recovery, and/or self-healing operations. Imaging with an operating system may refer to installation of one or more virtual machines and/or containers that may contain the operating system. Accordingly, imaged nodes described herein may provide a virtualization environment, including one or more virtual machines, containers, or combinations thereof.

Figure 2:
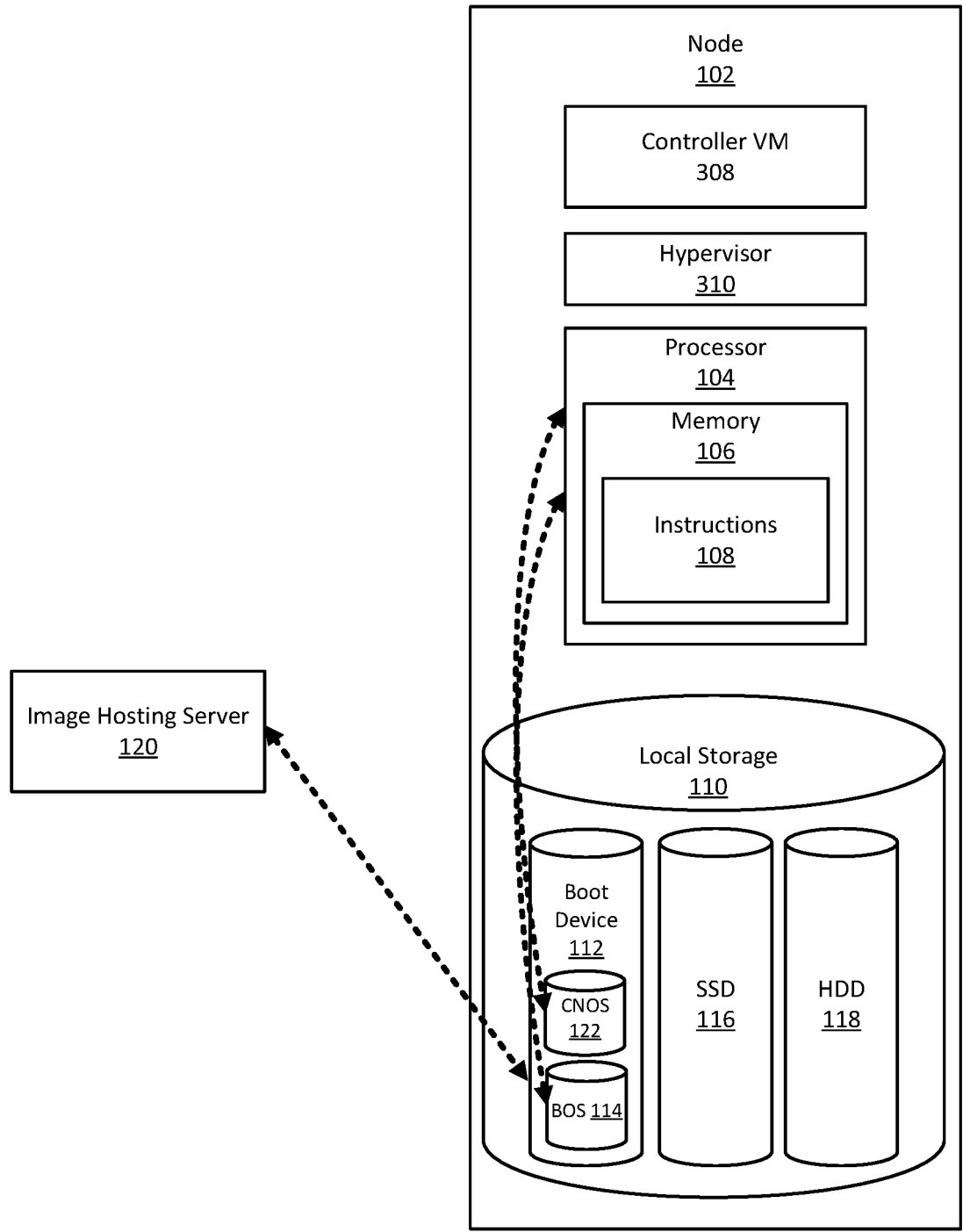
FIG. 2 is a schematic illustration of a self-bootstrapping system for self-bootstrapping a computing node during the imaging process, arranged in accordance with examples described herein.

FIG. 2 is a schematic illustration of a self-bootstrapping system 200 for self-bootstrapping and self-imaging a computing node during the imaging process, arranged in accordance with examples described herein. In other words, FIG. 2 is a schematic illustration of a self-bootstrapping system 200 at in intermediate step of booting and imaging. The self-bootstrapping system 200 may include elements that have been previously described with respect to the self-bootstrapping system 100 of FIG. 1. Those elements have been identified in FIG. 2 using the same reference numbers used in FIG. 1 and operation of the common elements is as previously described. Consequently, a detailed description of the operation of these particular elements will not be repeated in the interest of brevity.

As described herein, self-bootstrapping system 200 of FIG. 2 generally includes a computing node 102 and image hosting server 120 (e.g., imaging location). Computing node 102 may include processor 104. Processor 104 may include memory 106. Memory 106 may include instructions 108 (e.g., instructions for self-bootstrapping and self-imaging). Computing node 102 may include local storage 110, which may include boot device 112, solid-state drive (SSD) 116, and hard disk drive 118. As FIG. 2 is a schematic illustration of a self-bootstrapping system 200 for self-bootstrapping and self-imaging a computing node at an intermediate step during booting and imaging, boot device 112 may include bootstrap operating system 114, and now includes the another operating system 122, retrieved from image hosting server 102. Computing node 102 may further include one or more controller VMs, such as controller VM 308 and one or more hypervisors, such as hypervisor 310. As should be appreciated, the components shown in FIG. 2 are exemplary. Additional, fewer, and/or alternative components may be used in other examples. While a controller VM and a hypervisor are shown in FIG. 2, it should be understood that the hypervisor may in some examples perform the functions described herein as being performed by the controller VM. In some examples, one or more containers may be used to implement the controller VM.

Examples of controller VMs (CVMs), as described herein, may execute a variety of software and/or may serve the I/O operations for the additional and/or alternative components of a computing node, such as computing node 102. In some examples, controller VMs, as described herein, may execute a variety of software and/or may serve the I/O operations om hypervisor 126 of FIG. 2. With respect to FIGS. 3 and 4. In some examples, controller VMs, as described herein, may execute a variety of software and/or may serve the I/O operations for user VMs running on a computing nodes once booted and imaged, such as computing nodes 102 and 305 of FIGS. 3 and 4. In some examples, a small computer system interface (SCSI) controller, which may manage SSDs and/or HDDs devices described herein (such as SSD 116 and HDD 118, of FIG. 2), may be directly passed to the CVM, e.g., leveraging VM-Direct Path. In the case of Hyper-V, the storage devices may be passed through to the CVM. The controller VM 308 may also manage loading of the another operating system 122 (e.g., CNOS 122) on computing node 102, in some examples. After the computing node 102 is imaged with the another operating system 122 (e.g., CNOS 122), computing node 102 may be configured to join a single-node cluster and/or a multi-node cluster (and/or join a group/plurality of other computing nodes).

As described herein, computing node 102 may be configured to perform self-bootstrapping and/or self-imaging operations. The self-bootstrapping and/or self-imaging operations may run on any type of hypervisor (such as ESX, ESX(i), Hyper-V, KVM, or any other type of hypervisor), or on the physical computing node 102. In some examples, each type of hypervisor may have a hypervisor-specific API through which commands to perform various operations may be communicated to the particular type of hypervisor. The commands may be formatted in a manner specified by the hypervisor-specific API for that type of hypervisor. For example, commands may utilize a syntax and/or attributes specified by the hypervisor-specific API.

Computing node 102 may generally be configured to implement self-bootstrapping and self-imaging functionality as described herein (as well as self-recovery and/or self-healing functionality). In operation, computing node 102 may be in a physically remote location (e.g., remote from other computing nodes, remote from required IT personnel, at a ROBO site, etc.). In some examples, computing node 102 may be in a physically remote location, without the presence of other computing nodes. In some examples, computing node 102 may be in a physically remote location with one or more other computing nodes. In some examples, computing node 102 may be located in a remote location and in a state that is prior to being imaged with an operating system.

As described herein, computing node 102 may be configured to, using processor 104 and executing instructions 108, boot, from boot device 112, computing node 102 (itself) into a bootstrapping environment using bootstrap operating system 114. In some examples, the bootstrap operating system 114 may include an address of an image hosting server (e.g., an imaging location). In some examples, once booted into the bootstrapping environment, computing node 102 may be configured to access the image hosting server 120 and retrieve the another operating system 122. As described in this FIG. 2, computing node 102 has booted itself into a bootstrapping environment using bootstrap operating system 114 from boot device 112. As described in this FIG. 2, computing node 102 has further received a software image for computing node 112 including the another operating system 122 from image hosting server 120. In some examples, once received from an image hosting server, such as image hosting server 120, the another operating system may be stored at boot device 112 within local storage, such as within local storage 110. In some examples, computing node 102 may be configured to image itself using the another operating system 122. In some examples, computing node 102, using processor 104 executing instructions 108, may use the another operating system 122 to image itself. As should be appreciated, boot operating system 114 and the another operating system 122 may be, in some examples, different operating systems that provide both similar and/or alternative functionality to users, clients, administrators of computing node 102.

As should be appreciated, and as described herein and at least with respect to FIG. 1, computing node 102 of FIG. 2 may be configured to, by executing instructions 108, monitor the status of the imaging operations (e.g., the booting, accessing, receiving, imaging, etc.). In some examples, computing node 102, as described herein, may be configured to, by executing instructions 108, monitor the status of the imaging operations using an application programming interface (API) of the bootstrapping environment, such as a REST API, an RPC API, a GraphQL API, etc. In some examples, the API may be a combination of any of the API's described herein. As should be appreciated, the API used for monitoring the imaging operations may be an additional and/or alternative APIs to those listed herein, each of which is considered to be within the scope of this disclosure. As one non-limiting example, during the self-booting and/or self-imaging process, computing node 102 may be configured to post and/or publish progress updates in a file which can be sent to any coordinating service if needed. In some examples, a lightweight server can also run on computing node 102 (not shown) which can be called (e.g., via an API) to find out the imaging progress. In some examples, the progress updates may be maintained and served by a rest server that, in some examples, runs in the bootstrapping environment. In some examples, one or more users, clients, administrators, and the like may be able to monitor, via the APIs of the bootstrapping environment, the imaging process In some examples, and as described herein, computing node 102 (in some examples, executing instructions 108) may not need to invoke an API (such as the APIs described herein) to monitor the status of the imaging operations. In some examples, the system, such as self-bootstrapping system 100 of FIG. 1 may know itself since it may, in some examples, be executing the code to perform the imaging. In some examples, one or more APIs may be exposed by a node, such as node 102, and APIs, such as the APIs described herein, may be used by one or more external systems (if needed) for monitoring the tatus of the imaging operations.

In some examples, a computing node, such as computing node 102 of FIGS. 1-4, may be shipped to the remote location (e.g., remote site) with a controller VM or other controlling application already hosted on it (e.g., the code for the VM may already be present on the node, rather than relying on the bootstrap operating system to add a controller VM). In this example, the computing node 102 may be configured to boot itself into a bootstrapping environment instead needing to access an image hosting server (such as image hosting server 120) and receive a software image including the another operating system 122. In this example, computing node 102 may continue to self-image itself using the another operating system 122 (of FIGS. 1-2), as described herein, without needing to access the image hosting server 120. In some examples, the bootstrapping environment may be the phoenix bootstrapping environment. In some examples, the bootstrapping may be additional and/or alternative environments.

As described herein and at least with respect to FIG. 1, computing node 102 of FIG. 2 may be configured to, by executing instructions 108, provide (via a display, such as display 620 of FIG. 6) a graphical user interface (GUI) corresponding to and/or associated with the status of the imaging and/or boot operations. In some examples, the status provided by computing node 102 may comprise one or more progress updates associated with the imaging and/or boot operations. In some examples, the progress updates may be stored and/or presented in a log, such as an event log. In some examples, the one or more progress updates are stored on one or more files (e.g., log files, etc.) that may be accessible via the API of the bootstrapping environment. In some examples, one or more log files may comprise the one or more progress updates, and may be included in the event log.

As described herein and at least with respect to FIG. 1, computing node 102 of FIG. 2 may be configured to, by executing instructions 108, monitor and, based on determining that the imaging and/or boot operations have failed, restart the boot process to image computing node 102. In some examples, this may be characterized as self-recovery and/or self-healing, as described herein. In some examples, failure of the imaging and/or boot operations may be caused by one or more events/factors as described herein. As should be appreciated, although not explicitly listed here, additional and/or alternative events/factors may cause failure of the imaging and/or boot operations and are considered to be within the scope of this disclosure.

Figure 3:
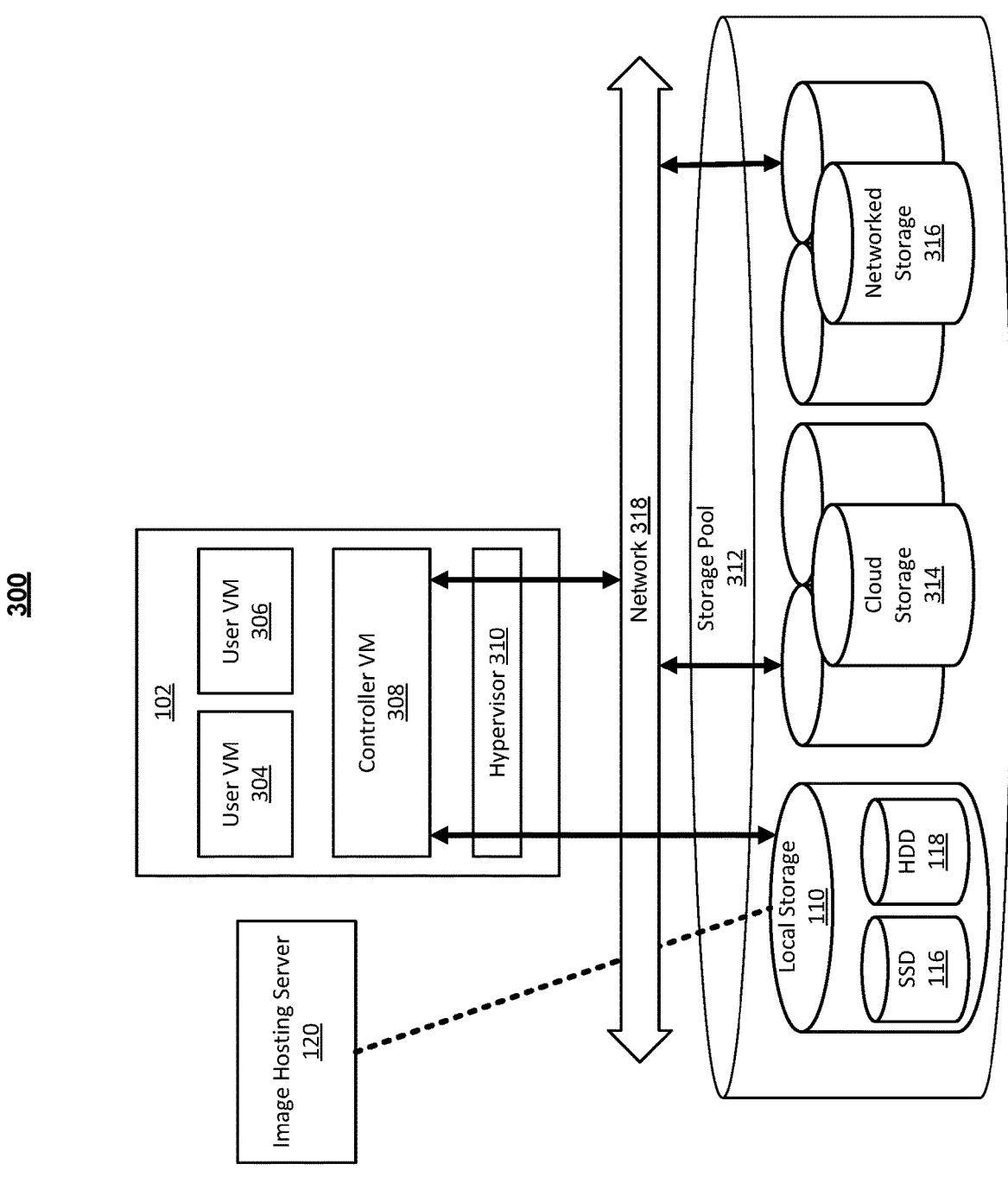
FIG. 3 is a schematic illustration of a distributed computing system including a self-bootstrapping computing node that has been imaged with an operating system and is part of a single-node cluster, arranged in accordance with examples described herein.

FIG. 3 is a schematic illustration of a distributed computing system 300 including a self-bootstrapping and self-imaging computing node that has been imaged with an operating system and is part of a single-node cluster, arranged in accordance with examples described herein. The distributed computing system 300 may include elements that have been previously described with respect to the self-bootstrapping system 100 of FIG. 1 and/or self-bootstrapping system 200 of FIG. 2. Those elements have been identified in FIG. 3 using the same reference numbers used in FIG. 1 and FIG. 2, and operation of the common elements is as previously described. Consequently, a detailed description of the operation of these particular elements will not be repeated in the interest of brevity.

As described herein, distributed computing system 300 of FIG. 3 generally includes a computing node 102, image hosting server 120 (e.g., imaging location), and storage pool 312 connected to a network 318. The network 318 may be any type of network capable of routing data transmissions from one network device (e.g., computing node 102, storage pool 312) to another. For example, the network 318 may be a local area network (LAN), wide area network (WAN), intranet, Internet, or a combination thereof. The network 318 may be a wired network, a wireless network, or a combination thereof. Although not shown, computing node 102 generally includes a processor, memory (e.g., non-transitory computer readable storage medium), and executable instructions stored on the memory that, when executed by, for example, one or more components of computing node 102 of FIG. 3, cause the computing node 102 to perform one or more operations.

Storage pool 312 may include local storage 110, cloud storage 314, and networked storage 316. The local storage 110 may include, for example, one or more solid state drives (SSD 116) and one or more hard disk drives (HDD 118). Local storage 110 may be directly coupled to, included in, and/or accessible by a respective computing node 202 without communicating via the network 318. Cloud storage 314 may include one or more storage servers that may be stored remotely to the computing node 102 and accessed via the network 318. The cloud storage 314 may generally include any type of storage device, such as HDDs SSDs, or optical drives. Networked storage 316 may include one or more storage devices coupled to and accessed via the network 318. The networked storage 316 may generally include any type of storage device, such as HDDs SSDs, or optical drives. In various embodiments, the networked storage 316 may be a storage area network (SAN). The computing node 102 is a computing device for hosting VMs in the distributed computing system 300 of FIG. 3. The computing node 102 may be, for example and as described herein, a server computer, a laptop computer, a desktop computer, a tablet computer, a smart phone, or any other type of computing device. The computing node 102 may include one or more physical computing components, such as processors and/or memory, such as non-transitory computer ready storage medium.

Recall that FIG. 3 is a schematic illustration of a distributed computing system 300 including a self-bootstrapping and self-imaging computing node 102 that has been imaged with an operating system and is part of a single-node cluster. Unlike computing node 102 of FIG. 1 and FIG. 2, computing node 102 of FIG. 3 is illustrated as being an imaged computing node, being imaged using an operating system, such as a computing node operating system, and/or the another operating system 122 of Figure and FIG. 2.

Similar to computing node 102 of FIG. 1 and FIG. 2, while computing node 102 of FIG. 3 is depicted as already being imaged, computing node 102 of FIG. 3 may be configured to, by executing instructions, monitor the status of the imaging operations (e.g., the booting, accessing, receiving, imaging, re-booting, healing, recovery, etc.). In some examples, computing node 102 of FIG. 3 may be configured to, by executing instructions, provide (via a display, such as display 620 of FIG. 6) a graphical user interface (GUI) corresponding to and/or associated with the status of the imaging and/or boot operations. In some examples, computing node 102 of FIG. 3 may be configured to, by executing instructions, monitor and, based on determining that the imaging and/or boot operations have failed, restart the boot process to image itself.

Figure 4:
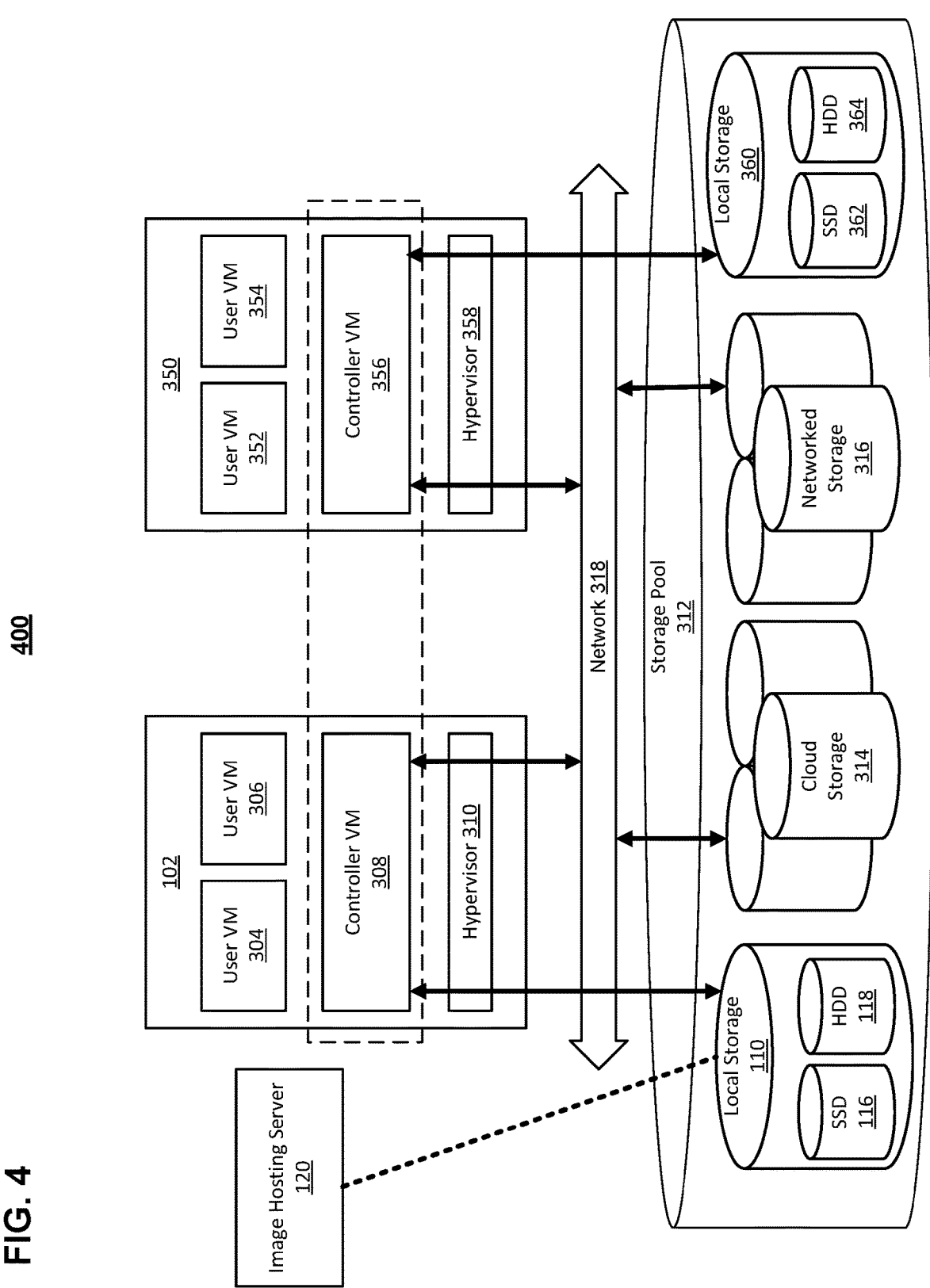
FIG. 4 is a schematic illustration of a distributed computing system including a self-bootstrapping a computing node that has been imaged with an operating system and is part of a multi-node cluster, arranged in accordance with examples described herein.

FIG. 4 is a schematic illustration of a distributed computing system 400 including a self-bootstrapping a computing node that has been imaged with an operating system and is part of a multi-node cluster, arranged in accordance with examples described herein. The distributed computing system 400 may include elements that have been previously described with respect to the self-bootstrapping system 100 of FIG. 1, self-bootstrapping system 200 of FIG. 2, and/or distributed computing system 300 of FIG. 3. Those elements have been identified in FIG. 3 using the same reference numbers used in FIGS. 1-3, and operation of the common elements is as previously described. Consequently, a detailed description of the operation of these particular elements will not be repeated in the interest of brevity.

As described herein, distributed computing system 400 of FIG. 4 generally includes a computing node 102, computing node 350, image hosting server 120 (e.g., imaging location), and storage pool 312 connected to a network 318. As descried herein, network 318 may be any type of network capable of routing data transmissions from one network device (e.g., computing node 102, computing node 350, storage pool 312, etc.) to another. For example, the network 318 may be a local area network (LAN), wide area network (WAN), intranet, Internet, or a combination thereof. The network 318 may be a wired network, a wireless network, or a combination thereof. Although not shown, computing node 102 and/or computing node 350 each generally include a processor, memory (e.g., non-transitory computer readable storage medium), and executable instructions stored on the memory that, when executed by, for example, one or more components of computing node 102 and/or computing node 350, cause the computing node 102 and/or computing node 350 to perform one or more operations.

As described above, storage pool 312 may include local storage 110, local storage 360, cloud storage 314, and networked storage 316. The local storage 110 and/or local storage 360 may include, for example, one or more solid state drives (SSD 116, SSD 362) and one or more hard disk drives (HDD 118, HDD 364). Local storage 110 may be directly coupled to, included in, and/or accessible by a respective computing node 102 without communicating via the network 318. Local storage 360 may also be directly coupled to, included in, and/or accessible by a respective computing node 350 without communicating via the network 318. Cloud storage 314 may include one or more storage servers that may be stored remotely to the computing node 102 and/or computing node 350 and accessed via the network 318. The cloud storage 314 may generally include any type of storage device, such as HDDs SSDs, or optical drives. Networked storage 316 may include one or more storage devices coupled to and accessed via the network 318. The networked storage 316 may generally include any type of storage device, such as HDDs SSDs, or optical drives. In various embodiments, the networked storage 316 may be a storage area network (SAN). Computing node 102 may be a computing device for hosting VMs in the distributed computing system 400 of FIG. 4. Computing node 350 may be a computing device for hosting VMs in the distributed computing system 400 of FIG. 4. Computing node 102 and/or computing nodes 350 may each be, for example, a server computer, a laptop computer, a desktop computer, a tablet computer, a smart phone, or any other type of computing device. Computing node 102 and/or computing node 350 may include one or more physical computing components, such as processors and/or memory, such as non-transitory computer ready storage medium.

Recall that FIG. 4 is a schematic illustration of a distributed computing system 400 including a self-bootstrapping and self-imaging computing node 102 that has been imaged with an operating system and is part of a multi-node cluster. Unlike computing node 102 of FIG. 1 and FIG. 2, computing node 102 of FIG. 4 is illustrated as being an imaged computing node, being imaged using an operating system, such as a computing node operating system, and/or the another operating system 122 of Figure and FIG. 2. While the booting and imaging process for computing node 350 is not described as herein as it is for computing node 102, it should be appreciated that computing node 350 (and/or additional and/or alternative computing nodes not shown in FIG. 4) may be configured for self-bootstrapping and self-imaging. It should further be appreciated that computing node 350 (and/or additional and/or alternative computing nodes not shown in FIG. 4) may be configured to be imaged using the assistance of a coordinating node, an orchestrator, a standalone virtual machine, or the like. It should further be appreciated that computing node 350 (and/or some of the additional and/or alternative computing nodes not shown in FIG. 4) may be configured for self-booting and self-imaging, while others may be configured to use the assistance of a coordinating node, an orchestrator, a standalone virtual machine, or the like.

Similar to computing node 102 of FIG. 1 and FIG. 2, and to computing node 102 of FIG. 3, while computing node 102 of FIG. 3 is depicted as already being imaged, computing node 102 and computing node 350 of FIG. 4 each may be configured to, by executing instructions, monitor the status of the imaging operations (e.g., the booting, accessing, receiving, imaging, re-booting, healing, recovery, etc.). In some examples, computing node 102 and computing node 350 of FIG. 4 may each be configured to, by executing instructions, provide (via a display, such as display 620 of FIG. 6) a graphical user interface (GUI) corresponding to and/or associated with the status of the imaging and/or boot operations. In some examples, computing node 102 and computing node 350 of FIG. 4 may be configured to, by executing instructions, monitor and, based on determining that the imaging and/or boot operations have failed, restart the boot process to image itself.

As should be appreciated. FIGS. 1-4 are schematic illustrations arranged in accordance with examples described herein. It should be appreciated that FIGS. 1-4 provides only an illustration of one implementation and does not imply any limitations with regard to the environments in which different embodiments may be implemented. Many modifications to the depicted environment may be made. The computing node 102 may implemented as at least part of the self-bootstrapping system 100 and 200 of FIGS. 1 and 2, respectively, and/or implemented as at least a part of the distributed computing system 300 and 400 of FIGS. 3 and 4 (or any other computing device or part of any other system described herein).

Turning now to FIG. 5, FIG. 5 is a flow diagram of a method 500 for imaging a self-bootstrapping computing node, arranged in accordance with examples described herein. This method 500 may be implemented, for example, using system 100 of FIG. 1.

The method 500 includes booting, from a boot device, the computing node into a bootstrapping environment using a bootstrap operating system, the bootstrap operating system configured with an address of an imaging location in block 502, accessing the imaging location and receive a software image for the computing node in block 504, and, imaging the computing node using the software image including installing another operating system on the computing node to boot from the boot device in block 506.

Block 502 recites booting, from a boot device, the computing node into a bootstrapping environment using a bootstrap operating system, the bootstrap operating system configured with an address of an imaging location.

Block 504 recites accessing the imaging location and receiving a software image for the computing node.

Block 506 recites imaging the computing node using the software image including installing another operating system on the computing node to boot from the boot device.

In some examples, any of the booting operations at block 502, accessing and receiving operations at block 504, and/or the imaging operations at block 506 may be considered an imaging and/or boot operations. In some examples, the status of the imaging operations may be monitored using an application programming interface (API) of the bootstrapping environment. In some examples, the API may be a REST API. In some examples, the API may be an RPC API. In some examples, the API may be a GraphQL API. In some examples, the API may be a combination of any of the API's described herein. As should be appreciated, the API used for monitoring the imaging operations may be an additional and/or alternative API to those listed herein, each of which is considered to be within the scope of this disclosure.

In some examples, a graphical user interface (GUI) corresponding to and/or associated with the status of the imaging and/or boot operations may be provided. In some examples, the status may comprise one or more progress updates associated with the imaging and/or boot operations. In some examples, the progress updates may be stored and/or presented in a log, such as an event log. In some examples, the one or more progress updates are stored on one or more files (e.g., log files, etc.) that may be accessible via the API of the bootstrapping environment. In some examples, one or more log files may comprise the one or more progress updates, and may be included in the event log.

In some examples, the imaging location may be in an image hosting server. In some examples, the imaging location may be a URL using one or more schemes, including Hypertext Transfer Protocol (HTTP), Hypertext Transfer Protocol Secure (HTTPS), Network File System (NFS), Server Message Block (SMB), or combinations thereof. In some examples, the URL may be accessible from the computing node (e.g., computing node 102 of FIGS. 1-2, and/or computing nodes 302 and 350 of FIGS. 3-4) without authentication (e.g., client, user, administrator, etc. authentication). In some examples, the image location may be at a filer location. In some examples, the imaging location may be specified in a dynamic host configuration protocol (DHCP) configuration and/or a JavaScript object notation (JSON) file, that may be provided to the computing node. In some examples, the imaging location may be a URL which points to, for example, a JSON file. In some examples, the URL may be passed to a node, e.g., node 102, in multiple ways. For example, the URL may be passed via a dynamic host configuration protocol (DHCP) configuration. In some examples, the system itself (e.g., self-bootstrapping system 100 of FIG. 1) may expect the URL to be hosted at a predefined location like, such as, for example, imaging_configuration.{domain}/a/b/c.json where the {domain} may be obtained from the DHCP server. In some examples, one or more users may have to ensure that the DNS is configured correctly so that such a URL will point to the required JSON file.

In some examples, the software image received for the computing node in response to accessing the imaging location by the boot device may comprise the another operating system (e.g., a computing node operating system, etc.) used to image the computing node. In some examples, the boot device comprises a solid-state drive (SSD), such as SSD 116 of FIGS. 1-4, hard disk drive (HDD), such as HDD 118 of FIGS. 1-4, and/or non-volatile memory express (NVMe), and/or combinations thereof.

In some examples, a status of the imaging and/or boot operations may be monitored and, based on determining that the imaging and/or boot operations have failed, restart the boot process to image the computing node (e.g., computing node 102 of FIGS. 1-2, etc.). In some examples, this may be characterized as self-recovery and/or self-healing. In some examples, failure of the imaging and/or boot operations may be caused by one or more events/factors. For example, in some examples, failure of the imaging and/or boot operations may be caused by a failure to access the imaging location (e.g., image hosting server) and receive the software image for the computing node (e.g., computing node 102 of FIGS. 1-2, etc.). In some examples, failure of the imaging and/or boot operations may be caused by accessing an incorrect imaging location. In some examples, failure of the imaging and/or boot operations may be caused by accessing an incorrect software image for the computing node. In some examples, failure of the imaging and/or boot operations may be caused by one or more of the above events/factors, or a combination of one or more of the above events/factors. As should be appreciated, although not explicitly listed herein, additional and/or alternative events/factors may cause failure of the imaging and/or boot operations, and are considered to be within the scope of this disclosure.

In some examples, the health of the computing node (e.g., computing node 102 of FIGS. 1-2, etc.) may be monitored. In some examples, the boot process may be restarted based on determining the computing node is in a failsafe state.

In some examples, upon completion of installing the another operating system (e.g., the computing node operating system, etc.) on the computing node (e.g., computing node 102 of FIGS. 1-2, etc.) to boot from the boot device, the computing node may be configured to join one or more other computing nodes as a plurality of computing nodes. In some examples, the plurality of computing nodes may comprise the one or more other computing nodes and the computing node booted and imaged. In some examples, each node of the plurality of computing nodes is configured to perform one or more functions, including a distributed file server function, a backup system function, or a combination thereof. In some examples, the plurality of computing nodes may be a cluster of computing nodes.

In some examples, upon completion of installing the another operating system (e.g., the computing node operating system, etc.) on the computing node (e.g., computing node 102 of FIGS. 1-2, etc.) to boot from the boot device, the computing node may be configured to operate without joining one or more other computing nodes. For example, upon completion of installing the another operating system (e.g., the computing node operating system, etc.) on the computing node (e.g., computing node 102 of FIGS. 1-2, etc.) to boot from the boot device, the computing node may be configured to join a single node cluster, wherein the single node is the recently booted and imaged computing node. In some examples, upon completion of installing the another operating system (e.g., the computing node operating system, etc.) on the computing node (e.g., computing node 102 of FIGS. 1-2, etc.) to boot from the boot device, the computing node may not join a plurality of other computing nodes. In some examples, the plurality of computing nodes and/or the computing node may be a cluster of nodes.

In this way, examples described herein facilitate and/or enable the self-imaging and self-configuration (including booting) of a node (e.g., a remote node) without the assistance of a coordinating node, an orchestrator, a standalone virtual machine, or the like. Further, examples herein describe the unique way in which standalone nodes (e.g., remote nodes, computing nodes, nodes deployed at a remote location, nodes deployed non-locally, etc.) can be bootstrapped without additional infrastructure at the remote (e.g., customer) site (e.g., location), by enabling the computing node to boot, image, and configure itself. As described throughout, examples described herein further facilitate and/or enable self-recovery and/or self-healing of the nodes by, for example, monitoring the imaging and/or booting operations during the booting and/or imaging process.

Figure 6:
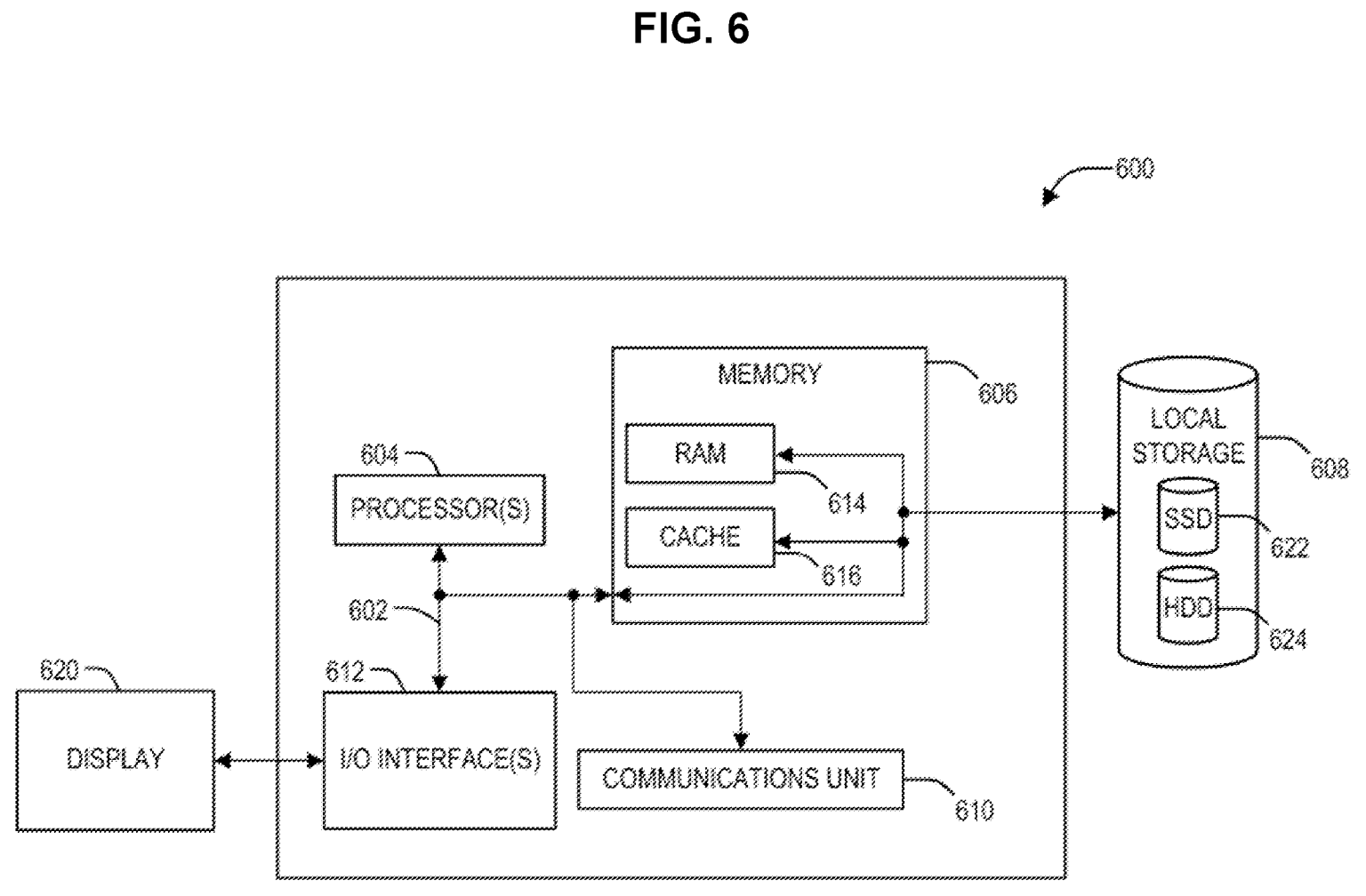

Turning now to FIG. 6, FIG. 6 depicts a block diagram of components of a computing node 600 in accordance with an embodiment of the present disclosure. It should be appreciated that FIG. 6 provides only an illustration of one implementation and does not imply any limitations with regard to the environments in which different embodiments may be implemented. Many modifications to the depicted environment may be made. The computing node 600 may implemented as any of the computing nodes 102 of FIG. 1 and/or FIG. 2, computing node 302 of FIG. 3, and/or either of the computing nodes 302 and/or 350 of FIG. 4. The computing node 600 may be configured to implement the method 500 of FIG. 5 to boot the computing node 600 into a bootstrapping environment and/or to image the computing node 600 by installing another operating system (e.g., a computing node operating system, and/or other operating systems, etc.) onto the computing node.

The computing node 600 includes a communications fabric 602, which provides communications between one or more processor(s) 604, memory 606, local storage 608, communications unit 610, I/O interface(s) 612. The communications fabric 602 can be implemented with any architecture designed for passing data and/or control information between processors (such as microprocessors, communications and network processors, etc.), system memory, peripheral devices, and any other hardware components within a system. For example, the communications fabric 602 can be implemented with one or more buses.

The memory 606 and the local storage 608 are computer-readable storage media. In this embodiment, the memory 606 includes random access memory RAM 614 and cache 616. In general, the memory 606 can include any suitable volatile or non-volatile computer-readable storage media. The local storage 608 may be implemented as described above with respect to local storage 110 of FIGS. 1-4, respectively. In this embodiment, the local storage 608 includes an SSD 622 and an HDD 624, which may be implemented as described above with respect to SSDs 116 and HDDs 118 of FIGS. 1-4, respectively.

Various computer instructions, programs, files, images, etc. may be stored in local storage 608 for execution by one or more of the respective processor(s) 604 via one or more memories of memory 606. In some examples, local storage 608 includes a magnetic HDD 624. Alternatively, or in addition to a magnetic hard disk drive, local storage 608 can include the SSD 622, a semiconductor storage device, a read-only memory (ROM), an erasable programmable read-only memory (EPROM), a flash memory, or any other computer-readable storage media that is capable of storing program instructions or digital information.

The media used by local storage 608 may also be removable. For example, a removable hard drive may be used for local storage 608. Other examples include optical and magnetic disks, thumb drives, and smart cards that are inserted into a drive for transfer onto another computer-readable storage medium that is also part of local storage 608.

Communications unit 610, in these examples, provides for communications with other data processing systems or devices. In these examples, communications unit 610 includes one or more network interface cards. Communications unit 610 may provide communications through the use of either or both physical and wireless communications links.

I/O interface(s) 612 allows for input and output of data with other devices that may be connected to computing node 600. For example, I/O interface(s) 612 may provide a connection to external device(s) 618 (not shown) such as a keyboard, a keypad, a touch screen, and/or some other suitable input device. External device(s) 618 (not shown) can also include portable computer-readable storage media such as, for example, thumb drives, portable optical or magnetic disks, and memory cards. Software and data used to practice embodiments of the present disclosure can be stored on such portable computer-readable storage media and can be loaded onto local storage 608 via I/O interface(s) 612. I/O interface(s) 612 may also connect to a display 620.

Display 620 provides a mechanism to display data to a user, client, administrator, etc., and may be, for example, a computer monitor.

Various features described herein may be implemented in hardware, software executed by a processor, firmware, or any combination thereof. If implemented in software (e.g., in the case of the methods described herein), the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

From the foregoing it will be appreciated that, although specific embodiments of the disclosure have been described herein for purposes of illustration, various modifications may be made without deviating from the spirit and scope of the disclosure. Thus, the disclosure is not limited to the examples and designs described herein except as by the appended claims, and is to be accorded the broadest scope consistent with the principles and novel features disclosed herein.

What is claimed is:

1. A computing node comprising:
   a boot device;
   at least one processor;
   at least one non-transitory computer readable storage medium encoded with instructions which, when executed are configured to cause the computing node to perform imaging operations comprising:
      boot, from the boot device, the computing node into a bootstrapping environment using a bootstrap operating system, the bootstrap operating system configured with an address of an imaging location;
      access the imaging location and receive a software image for the computing node; and
      image the computing node using the software image including installing another operating system on the computing node to boot from the boot device.

2. The computing node of claim 1, wherein the instructions, when executed, further cause the computing node to:
   monitor, based at least on an application programming interface (API) of the bootstrapping environment, a status of the imaging operations.

3. The computing node of claim 2, wherein the instructions, when executed, further cause the computing node to:
   provide, using a graphical user interface, the status of the imaging operations based at least on the monitoring, wherein the status comprises one or more progress updates associated with the imaging operations.

4. The computing node of claim 1, wherein the imaging location is a URL using one or more schemes, including Hypertext Transfer Protocol (HTTP), Hypertext Transfer Protocol Secure (HTTPS), Network File System (NFS), Server Message Block (SMB), or combinations thereof, and wherein the URL is accessible from the computing node without client authentication.

5. The computing node of claim 1, wherein the imaging location is a URL and points to a JavaScript object notation (JSON) file provided to the computing node.

6. The computing node of claim 3, wherein the one or more progress updates are stored on one or more files, wherein at least one of the one or more files is accessible via the API of the bootstrapping environment, and wherein one or more log files may comprise the one or more progress updates.

7. The computing node of claim 2, wherein the instructions, when executed, further cause the computing node to:
    monitor the status of the imaging operations; and
    based on determining that the imaging operations have failed, restart the boot process to image the computing node.

8. The computing node of claim 1, wherein the instructions, when executed, further cause the computing node to:
    monitor a health status of the computing node;
    based on determining the computing node is in a failsafe state, restart the boot process to image the computing node.

9. The computing node of claim 7, wherein failure of the imaging operations is caused by one or more of a failure to access the imaging location and receive the software image for the computing node, accessing an incorrect imaging location, accessing an incorrect software image for the computing node, or combinations thereof.

10. The computing node of claim 1, wherein the instructions, when executed, further cause the computing node to:
    upon completion of installing the another operating system on the computing node to boot from the boot device, cause the computing node to join one or more other computing nodes as a plurality of computing nodes.

11. The computing node of claim 10, wherein the plurality of computing nodes comprises the one or more other computing nodes and the computing node, and wherein each node of the plurality of computing nodes is configured to perform one or more functions, including a distributed file server function, a backup system function, or a combination thereof.

12. The computing node of claim 1, wherein the instructions, when executed, further cause the computing node to:
    upon completion of installing the another operating system on the computing node to boot from the boot device, cause the computing node to operate without joining one or more other computing nodes.

13. The computing node of claim 11, wherein the plurality of nodes is a cluster of nodes.

14. The computing node of claim 1, wherein the software image comprises the another operating system and wherein the boot device comprises a solid-state drive (SSD), hard disk drive (HDD), non-volatile memory express (NVMe), or combinations thereof.

15. The computing node of claim 2, wherein the API is a REST API, an RPC API, a GraphQL API, or combinations thereof.

16. The computing node of claim 1, wherein the image location is at a filer location.

17. At least one non-transitory computer-readable storage medium including instructions that when executed by a computing node in a computing system, cause the computing node to:

boot, from a boot device, the computing node into a bootstrapping environment using a bootstrap operating system, wherein the bootstrap operating system is configured with an address of an imaging location comprising another operating system;
    access, by the computing node, the imaging location and receiving a software image for the computing node comprising the another operating system; and
    image, by the computing node, the computing node using the software image, the imaging including installing the another operating system on the computing node to boot from the boot device.

18. The at least one non-transitory computer-readable storage medium of claim 17, the computing node further caused to monitor, based at least on an application programming interface (API) of the bootstrapping environment, a status of the imaging operations.

19. The at least one non-transitory computer-readable storage medium of claim 18, the computing node further caused to provide, using a graphical user interface, the status of the imaging operations based at least on the monitoring, wherein the status comprises one or more progress updates associated with the imaging operations.

20. The at least one non-transitory computer-readable storage medium of claim 17, wherein the imaging location is a URL using one or more schemes, including Hypertext Transfer Protocol (HTTP), Hypertext Transfer Protocol Secure (HTTPS), Network File System (NFS), Server Message Block (SMB), or combinations thereof, and wherein the URL is accessible from the computing node without client authentication.

21. The at least one non-transitory computer-readable storage medium of claim 17, wherein the imaging location is a URL and points to a JavaScript object notation (JSON) file provided to the computing node.

22. The at least one non-transitory computer-readable storage medium of claim 19, wherein the one or more progress updates are stored on one or more files, wherein at least one of the one or more files is accessible via the API of the bootstrapping environment, and wherein one or more log files may comprise the one or more progress updates.

23. The at least one non-transitory computer-readable storage medium of claim 18, the computing node further caused to:
    monitor the status of the imaging operations; and
    based on determining that the imaging operations have failed, restart the boot process to image the computing node.

24. The at least one non-transitory computer-readable storage medium of claim 17, the computing node further caused to:
    monitor a health status of the computing node;
    based on determining the computing node is in a failsafe state, restart the boot process to image the computing node.

25. The at least one non-transitory computer-readable storage medium of claim 23, wherein failure of the imaging operations is caused by one or more of a failure to access the imaging location and receive the software image for the computing node, accessing an incorrect imaging location, accessing an incorrect software image for the computing node, or combinations thereof.

26. The at least one non-transitory computer-readable storage medium of claim 17, the computing node further caused to:
    upon completion of installing the another operating system on the computing node to boot from the boot device, cause the computing node to join one or more other computing nodes as a plurality of computing nodes.

27. The at least one non-transitory computer-readable storage medium of claim 26, wherein the plurality of computing nodes comprises the one or more other computing nodes and the computing node, and wherein each node of the plurality of computing nodes is configured to perform one or more functions, including a distributed file server function, a backup system function, or a combination thereof.

28. The at least one non-transitory computer-readable storage medium of claim 17, the computing node further caused to:
   upon completion of installing the another operating system on the computing node to boot from the boot device, cause the computing node to operate without joining one or more other computing nodes.

29. The at least one non-transitory computer-readable storage medium of claim 27, wherein the plurality of nodes is a cluster of nodes.

30. A method comprising:
   booting, from a boot device, a computing node into a bootstrapping environment using a bootstrap operating system, wherein the bootstrap operating system is configured with an address of an image hosting server comprising a computing node operating system;
   accessing, by the computing node, the image hosting server and receiving a software image for the computing node comprising the computing node operating system; and
   imaging, by the computing node, the computing node using the software image, the imaging including installing the computing node operating system on the computing node to boot from the boot device.

31. The method of claim 30, the method further comprising:
   monitoring a status of the imaging, the monitoring based at least on an application programming interface (API) of the bootstrapping environment.

32. The method of claim 31, the method further comprising:
   providing, using a graphical user interface, the status of the imaging based at least on the monitoring, wherein the status comprises one or more progress updates associated with the imaging.

33. The method of claim 30, wherein a location of the image hosting server is located at a URL using one or more schemes, including Hypertext Transfer Protocol (HTTP), Hypertext Transfer Protocol Secure (HTTPS), Network File System (NFS), Server Message Block (SMB), or combinations thereof, and wherein the URL is accessible from the computing node without client authentication.

34. The method of claim 33, wherein the location of the image hosting server is a URL and points to a JavaScript object notation (JSON) file provided to the computing node.

35. The method of claim 32, wherein the one or more progress updates are stored on one or more files, wherein at least one of the one or more files is accessible via the API of the bootstrapping environment, and wherein one or more log files may comprise the one or more progress updates.

36. The method of claim 31, the method further comprising:
   monitoring the status of the imaging; and
   based on determining that the imaging has failed, restarting the boot process to image the computing node.

37. The method of claim 30, the method further comprising:
   monitoring a health status of the computing node;
   based on determining the computing node is in a failsafe state, restarting the boot process to image the computing node.

38. The method of claim 36, wherein failure of the imaging is caused by one or more of a failure to access the image hosting server and receive the software image for the computing node, accessing an incorrect image hosting server, accessing an incorrect software image for the computing node, or combinations thereof.

39. The method of claim 30, the method further comprising:
   upon completion of installing the computing node operating system on the computing node to boot from the boot device, cause the computing node to join one or more other computing nodes as a plurality of computing nodes.

40. The method of claim 39, wherein the plurality of computing nodes comprises the one or more other computing nodes and the computing node, and wherein each node of the plurality of computing nodes is configured to perform one or more functions, including a distributed file server function, a backup system function, or a combination thereof.

41. The method of claim 30, the method further comprising:
   upon completion of installing the computing node operating system on the computing node to boot from the boot device, cause the computing node to operate without joining one or more other computing nodes.

42. The method of claim 40, wherein the plurality of nodes is a cluster of nodes.

* * * * *